US006941524B2

(12) United States Patent
Lee et al.

(10) Patent No.: US 6,941,524 B2
(45) Date of Patent: Sep. 6, 2005

(54) SYSTEM AND METHOD FOR DISPLAYING A RECURSIVE RELATIONSHIP BETWEEN OBJECTS IN A TREE

(75) Inventors: Letitia K. Lee, San Jose, CA (US); Robin Meryl Noble-Thomas, San Jose, CA (US); Wei Zhou, Pacifica, CA (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/154,964

(22) Filed: May 24, 2002

(65) Prior Publication Data

US 2003/0218639 A1 Nov. 27, 2003

(51) Int. Cl.[7] .............................. G06F 3/00; G06F 9/00; G06F 17/00; G06F 17/30; G06T 11/20
(52) U.S. Cl. ......................... 715/854; 345/440; 707/1
(58) Field of Search ................................. 715/968, 853, 715/854, 855, 738, 739, 821, 823, 514, 712, 713, 767, 783, 820, 817, 828, 829, 847, 907; 707/104.1, 102, 1, 2, 3, 4, 5; 717/132, 133, 144, 131, 104, 156; 345/440, 645

(56) References Cited

U.S. PATENT DOCUMENTS

| | | |
|---|---|---|
| 5,305,430 A | 4/1994 | Glassner |
| 5,581,634 A | 12/1996 | Heide .......................... 382/226 |
| 5,704,041 A | 12/1997 | Allen et al. |
| 5,737,559 A | 4/1998 | Orton et al. |
| 5,883,629 A | 3/1999 | Johnson ....................... 345/419 |
| 6,035,330 A * | 3/2000 | Astiz et al. ................... 709/218 |
| 6,078,327 A | 6/2000 | Liman et al. |
| 6,108,698 A * | 8/2000 | Tenev et al. ................. 709/220 |
| 6,189,012 B1 * | 2/2001 | Mital et al. ............. 707/103 R |
| 6,189,019 B1 * | 2/2001 | Blumer et al. .............. 715/513 |
| 6,300,965 B1 | 10/2001 | Sowizral et al. ............ 345/622 |
| 2001/0022592 A1 | 9/2001 | Alimpich et al. |
| 2001/0049682 A1 | 12/2001 | Vincent et al. ............. 707/100 |

FOREIGN PATENT DOCUMENTS

| | | | | |
|---|---|---|---|---|
| JP | 11249903 | | 9/1999 | ............. G06F/9/45 |
| JP | 2000231506 A | | 12/2000 | |

OTHER PUBLICATIONS

Patterson et al., "Direct Evaluation of Fault Trees Using Object–Oriented Programming Techniques," IEEE Transactions on Reliability, vol. 38, No. 2, Jun. 1989, pp. 186–192.

(Continued)

Primary Examiner—Raymond J. Bayerl
Assistant Examiner—Blaine Basom
(74) Attorney, Agent, or Firm—Samuel A. Kassatly

(57) ABSTRACT

A computer program product is provided as a system and associated method that allows the user to view a hierarchical lineage in a tree format even in the event of recursive circular relationships. The system prevents the lineage tree from being infinitely expandable truncating tree expansion when encountering a child that has previously appeared in the tree. If the user attempts to expand on an object that leads to a child already displayed in the tree, the system replaces the child's icon with one that resembles a recursive icon. The recursive icon is displayed by the system at the point of recursion, showing that an infinite, recursive relationship has occurred.

32 Claims, 5 Drawing Sheets

OTHER PUBLICATIONS

Tuncel, "Utilization of the Recursive Shortest Spanning Tree Algorithm for Video–Object Segmentation by 2–D Affine Motion Modeling," IEEE Transactions on Circuits and Systems for Video Technology, vol. 10, No. 5, Aug. 2000, pp. 776–781.

"Distributed Parallel Build System for Hierarchical Organized Large Scale Software Systems," IBM Technical Disclosure Bulletin, vol. 39, No. 06, Jun. 1996.

C.C. Low et al., "Efficient Access Methods in Deductive and Object–Oriented Databases," Deductive and Object–Oriented Databases, Second International Conference, DOOD'91, Munich, Germany, Dec. 16–18, 1991.

H. Samet et al., "Approximating CSG trees of moving objects." This is an expanded version of a paper titled "Bin–trees, CSG Trees, and Time" that appeared in Proceedings of the SIGGRAPH '85 Conference, San Francisco (Jul. 1985), pp. 121–130.

* cited by examiner

SYSTEM AND METHOD FOR DISPLAYING A RECURSIVE RELATIONSHIP BETWEEN OBJECTS IN A TREE

FIELD OF THE INVENTION

The present invention relates in general to user-interactive computer supported displays, and particularly to a user-interactive system and method that provide interactive users with a user-friendly interface for accessing lineage tree displays used in queries and data warehousing applications. The system of the invention provides a method for displaying objects in a lineage tree even if recursive elements in the tree exist, allowing the lineage tree to be automatically expanded even if a recursive node exists.

BACKGROUND OF THE INVENTION

Businesses and consumers exert a continuing demand on the consumer electronics industry for improvements in computer and network display interfaces for accessing functions and data from the computer. Businesses demand interfaces that are quickly learned by their existing workforce while consumers require interfaces that are easily understood and mastered. In the area of database management and data warehousing, interfaces to the databases appear to be formidable obstacles to many users who would have considerable needs for data access. Historically, database management was one of the primary computer functions; consequently, it is based on language and functions developed by computer professionals that are not accessible to the average employee or consumer. As a result, data management and access may be somewhat esoteric and foreboding to new computer users in the business and personal computer situations that would most benefit from the development of and access to databases.

One particular hurdle for database comprehension is that the average computer user finds it very difficult to frame database search queries out of the relatively complex SQL language used by many databases. In addition, once the query is formed, display of the results can be difficult to interpret and manage when it includes recursive relationships between objects. Query results that include object relationships are typically presented to the user graphically as a hierarchical display called a tree format. Using a tree format, the Lineage tree window displays objects that are related as input or output to data transformers and data resources. This allows the lineage or heritage of how a data resource is built to be traced backwards. The lineage tree function is used primarily for warehouse center metadata that describes tasks and data resources and the relationships between them. A lineage tree as displayed by the computer consists of a root and children; the lineage tree function is applied to the root, producing objects that are the "children".

A tree view is advantageous for displaying relationships between objects because it allows the user to expand on objects, displaying the children contained within the tree. Due to its graphical representation, results returned in a tree view are relatively easy to interpret. However, tree views present certain shortcomings for conventional design applications. One disadvantage is the manner in which the display manages recursive relationships, ones that have as children an object currently displayed above as an ancestor in the tree. In standard database applications using tree views for graphical interface, the existence of a recursive relationship could cause the lineage tree to expand infinitely. Should the user decide to expand the entire tree, the computer system could encounter a memory constraint problem, leading to significant waste of precious CPU time, an inability to automatically expand the tree, and difficulty in finding objects as the view becomes cluttered with repetitive information.

Thus, there is need for a system which displays results of objects with recursive relationships in an easy to understand graphical format that also prevents the user from engaging the problems inherent in recurrent branches and relationships. The need for such a system has heretofore remained unsatisfied.

SUMMARY OF THE INVENTION

The system and method for displaying a recursive relationship between objects in a tree satisfies this need. This invention describes a system and method that allows the user to see a hierarchical lineage in a tree format even in the event of recursive circular relationships by preventing the lineage tree from being infinitely expandable. The system of the invention truncates tree expansion when encountering a child that has previously appeared in the tree. The system of the invention provides an effective, user-friendly, GUI-based solution involving the display of a "recycle" icon. If the user attempts to expand on an object that leads to a child already displayed in the tree, the system of the invention replaces the child's icon with one that resembles a recycling metaphor. The "recycle" icon is displayed by the system of the invention at the point of recursion, showing that an infinite, recursive relationship has occurred.

The present invention prevents the waste of computer memory due to infinitely expanding trees and excessive consumption of CPU time spent performing queries within circular relationships. Among the features of the present system are: a) the recycling icon (or recycling metaphor which is posted at the truncation of infinitely recursive branches and b) the "Expand all" command which automatically expands the entire tree with the click of a button. Without the introduction of the "recycle icon" as a substitute for recursive branches, automatic expansion of the entire tree would not be possible. The introduction of these two features greatly enhances the ease of use for the typical user. The user does not have to expand the tree step-by-step, and any recursions in the tree can be seen without incurring computer system problems with memory or CPU resources. This allows the average user more power and flexibility in developing and analyzing database queries. The user does not have to carefully plan each query to preclude the display of recursive branches. In addition, the user can easily see the objects and nodes on the tree because the lineage tree display isn't cluttered with many repeating branches.

The system of the invention also maintains for each query display a list of objects that appear in the query response tree. This list of objects is referenced by the system when adding a new object to the tree. If the object is "recursive" (i.e, found in the list) the system adds a recycle icon to the parent object and the recursive object is not displayed. By eliminating the possibility of displaying recursive objects, the system of the invention renders data warehouse manipulations more effective.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Data Warehousing: an all-encompassing term for a system that stores, retrieves and manages sizeable amounts of many types of data. Typical data warehouse software employs complex steps or programs to manipulate data into formats needed for more advanced operations or analysis. Data warehousing may also comprise a remote database holding current snapshots of corporate data. Researchers and developers utilize the data targets produced though warehousing steps without slowing daily operations of the production database.

Internet: A collection of interconnected public and private computer networks that are linked together with routers by a set of standards protocols to form a global, distributed network.

SQL: Structured Query Language, a standardized query language for requesting information from a database.

Metadata: data about data. Metadata is definitional data that provides documentation of or information about other data managed within an environment or by an application. Metadata may document data about data elements or attributes such as name, size, or data type. It may also log data about data structures including length, fields, and columns. Other data included in Metadata encompass the association, storage location, and ownership of data. Metadata may additionally include descriptive information about the context, quality and condition, and/or characteristics of data.

Figure 1:
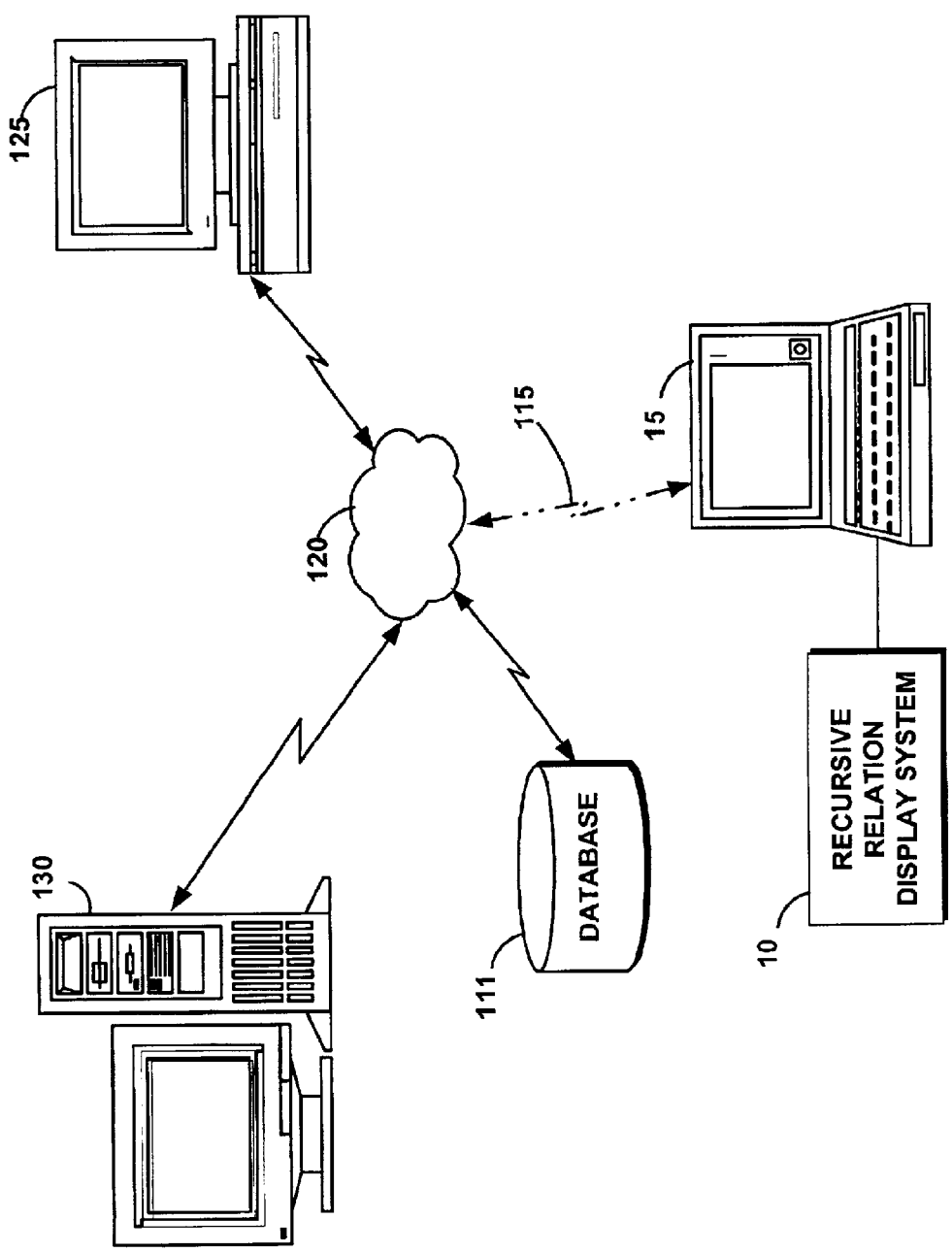
FIG. 1 is a schematic illustration of an exemplary operating environment in which a recursive relation display system of the present invention displays a recursive relationship between two trees system.

FIG. 1 portrays the overall environment in which a method for displaying a recursive relationship between objects in a tree system 10 according to the present invention may be used. The system 10 includes a software or computer program product that is typically embedded within, or installed on a client machine 15. Alternatively, the display system can be saved on a suitable computer usable medium such as a diskette, a CD, a hard drive, or like storage devices. While the display system will be described in connection with query searches, the display system can be used with a stand-alone machine with a local database of documents or other text sources that may have been derived from the WWW (World Wide Web) or other sources.

The cloud-like communication network 20 is comprised of communication lines and switches connecting servers to gateways. The servers and the gateways provide the communication access to the WWW Internet. Users, such as remote Internet users (or clients) are represented by a variety of computers such as computers 15, 125, 130, and can query a database or file server 111 for the desired information. The display of the information is rendered on the users machines such as computers 15, 125, 130. Though one recursive relation display system 10 is shown connected to one client computer 15, which system 10 is readily accessible by the other remote client computers 125, 130, it should be clear that each of these remote client computers 125,130, could be provided with a dedicated (or shared) recursive relation display system 10.

The client machine 15 is connected to the network 120 via a communications link 115, such as a telephone, cable, or satellite link. The servers in the network 120 can be connected via high speed Internet network lines to other computers and gateways. The servers provide access to stored information such as hypertext or web documents. The hypertext documents most likely include embedded hypertext link to other locally stored pages, and hypertext links to other webs sites or documents that are stored by various web servers.

Figure 2:
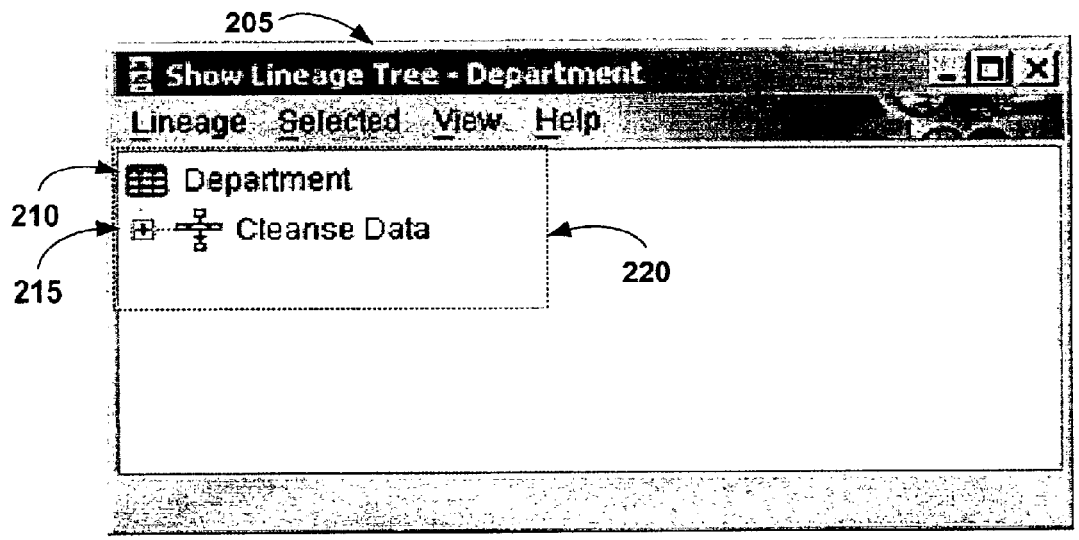
FIG. 2 portrays an example Show Lineage Tree window (or screen shot) in accordance with the operation of the system of the present invention.

The system 10 graphically displays a tree hierarchy as shown by the "show lineage tree" window 205 in FIG. 2. In window 205, the lineage tree function displays the objects and functions that either lead to the data found in data resource 210 or are passed through a data transformer such as node 215. For example, data resource 210 represents a table labeled "Department" which is the root of the tree 220. Node 215 represents the task "Cleanse Data", while data resource 210 represents an address location of the table "Department" which is the output target from the task at node 215. The "+" symbol at node 215 indicates that there are hierarchical or precedence relationships within this object. Clicking the "+" symbol expands a parent node into at least one child node. Though specific symbols, such as "+" and "−" are used herein as exemplary symbols, it is clear that other symbols could alternatively be used to perform the same or similar functions.

Figure 3:
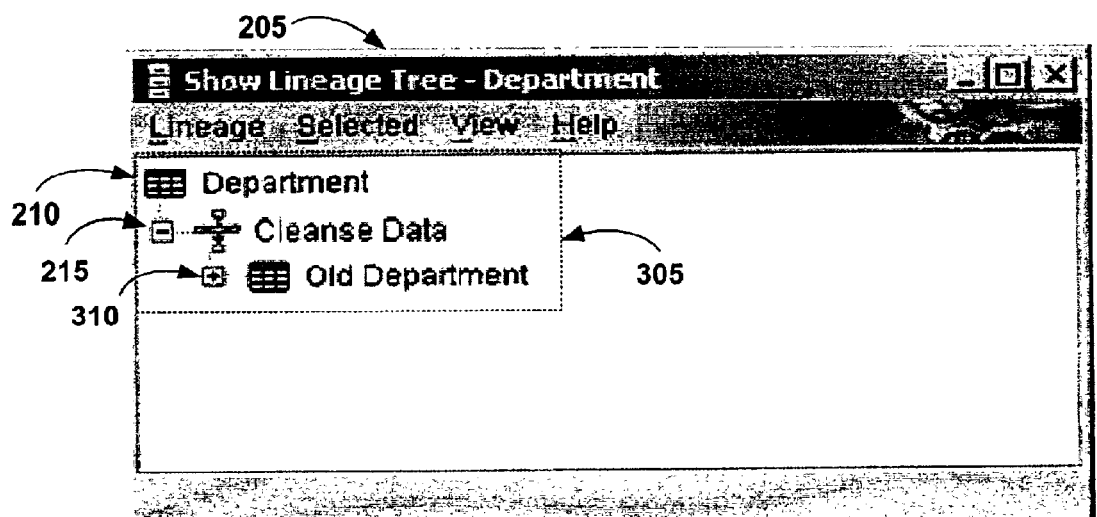
FIG. 3 illustrates an expanded tree view of the example of FIG. 2.

The lineage tree 220 of window 205 is displayed in FIG. 3 in a partially expanded tree 305. The "cleanse data" node 215 represents a task that is responsible for data extraction, transformation, and loading into the data resource 210. Data resource 310 is the input source table labeled "Old Department" that was processed by the "cleanse data" node 215 to create output target data resource 210. Clicking the "−" symbol at node 215 collapses tree 305, reverting to the tree 220 displayed in FIG. 2.

Figure 4:
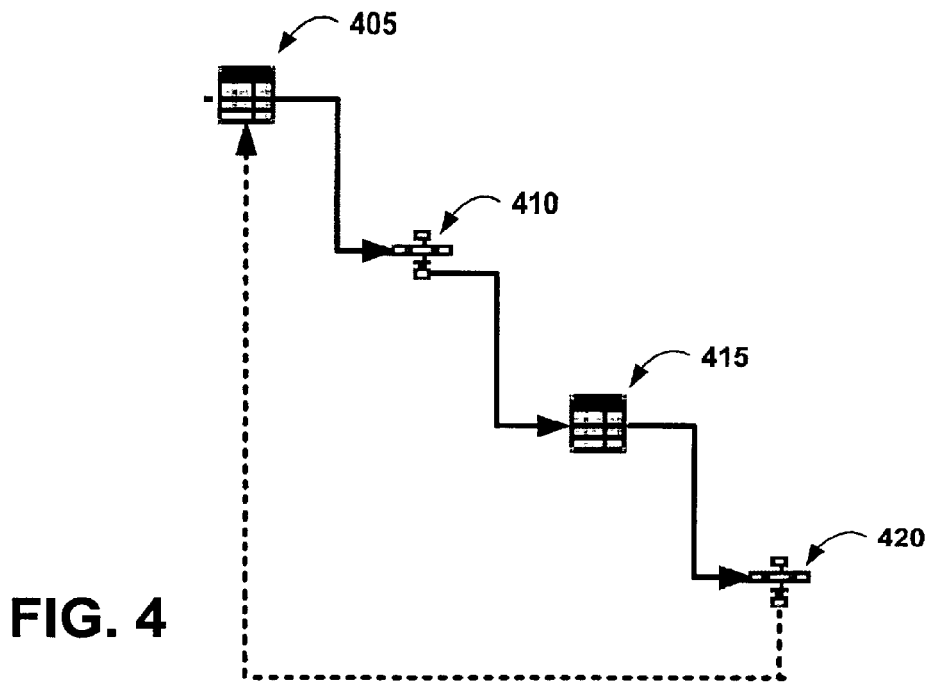
FIG. 4 illustrates an example of a recursive complication in an expanded tree view.

FIG. 4 illustrates through an expanded tree view the complications in displaying lineage trees with recursive branches. As seen in FIG. 4, the nodes 405, 410, 415, 420 are objects that are returned as a result of a query. Object 405 is the main parent node in this tree, similar to data resource 210 in FIG. 2. Object 410 is the child of the parent object 405 and the parent of child object 415. Object 415 is simultaneously the child of object 410 and the grandchild of object 405. Similarly, object 420 is the child of object 415, the grandchild of 410, the great-grandchild of 405 as well as the parent of object 405. At object 420, the tree view starts to infinitely expand in a recursive branch, presenting a graphical display challenge to the traditional lineage tree.

Figure 5:
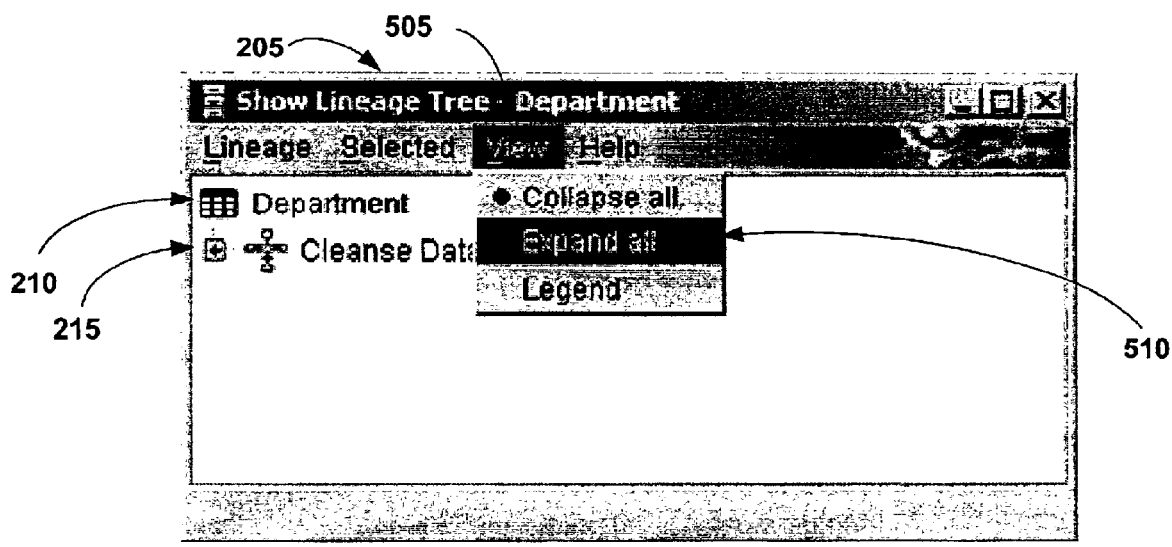
FIG. 5 illustrates the "Expand All" function.

The system 10 of the invention solves the problem of recursive branches in a graphical display of hierarchical trees by inserting a "recycle" icon at the point the recurring branch occurs. FIG. 5 shows window 205 with the expandable tree 220. The user selects pull-down menu item 505. The use of an icon to represent a recurring branch enables the system 10 to provide the "expand all" feature 510. Data resource 210, "Department", is the root of the tree 220. The "+" at node 215 indicates that there are hierarchical relationships within the node 215 labeled "Cleanse Data". The user may click on the "+" at node 420 to expand this parent node into children nodes. Alternatively, the user may select the view pull-down menu 505 that offers the user a choice to either automatically collapse all nodes or automatically expand all nodes in the tree 220. As seen by the highlighted background, the user selects the "Expand all" option 510, selecting automatic expansion of the tree. This feature of the invention expands the tree in its entirety. If a repeating node is part of the tree 220, the system 10 truncates the recurring branch at the object closest in hierarchy to the repeating node and a "recycle" icon terminates the branch.

Figure 6:
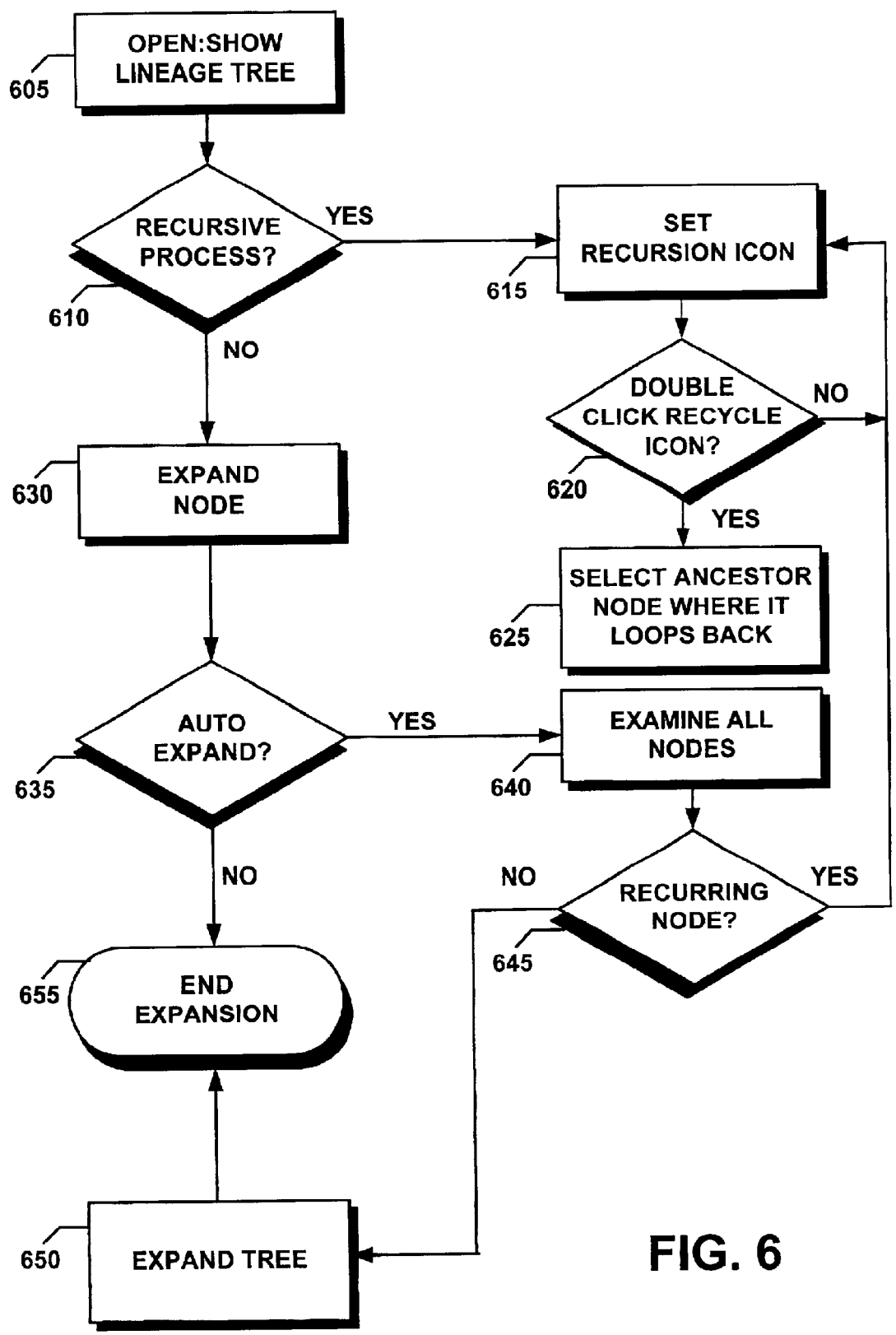
FIG. 6 is a flow chart illustrating the logic of a preferred embodiment of the present system.

The logic of the preferred embodiment of the invention is described by the flowchart of FIG. 6. In operation, and with further reference to the example of FIG. 7, the user opens the show lineage tree window 205 in step 605 to display the first data resource 210 and task node 215 in the lineage tree 705. System 10 checks to determine if the first child node 215 involves a recursive process at step 610. If so, the system 10 inserts a recursion icon at step 615, selects the recursion icon at step 620, and sets that node as a "last node". If the user double clicks the recursion (or recycle) icon, then the selection is returned to the node preceding the recursive node in step 625. If the first step is not recursive, then system 10 proceeds to step 630 and expands the node.

Figure 7:
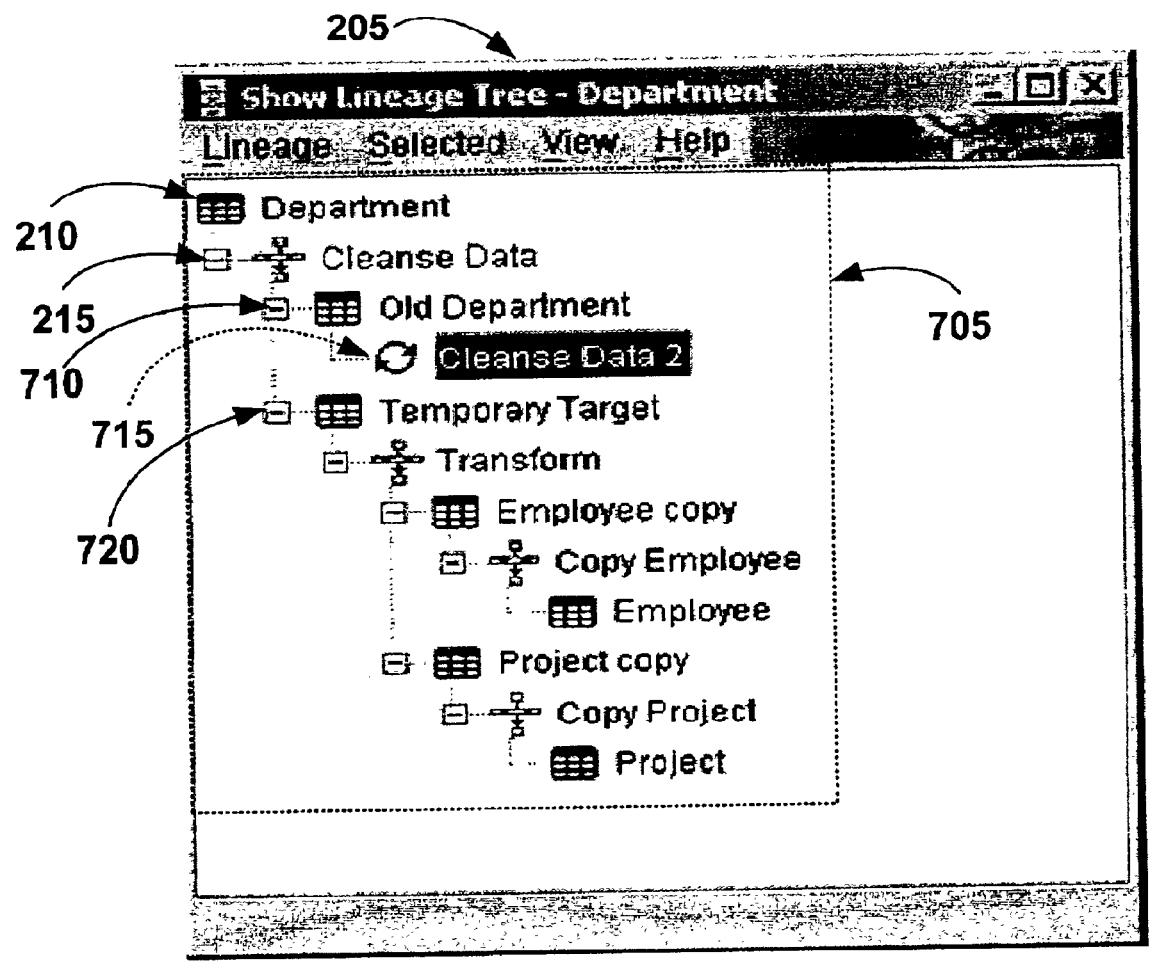
FIG. 7 illustrates a window that exemplifies the performance of the present system.

There are two methods for expanding any tree: manual expand and auto expand. In the case of FIG. 7, auto expand has been selected. If system 10 detects a request for auto expansion in step 635, system 10 examines all nodes in the lineage tree 705 in step 640, comparing each node with a list of nodes maintained by system 10 for the lineage tree 705. Any duplicate objects in the list of ancestor nodes are recurring objects. If system 10 detects a recurring node at step 645, the system inserts a recursion icon at the point of recursion in step 615, sets the recursion icon for the object at that point in step 625.

In the example of FIG. 7, the first object is data resource 210. The first task is at node 215, "cleanse data". The source for data resource 210 is data resource 215 "old department". In examining the list of ancestor nodes in step 640, system 10 finds that the following task Cleanse Data 2 (715) has a relationship to data resource Department (210) making a circular loop. System 10 replaces this recursive branch in step 615 by inserting a recursion recycle icon for "Cleanse Data 2" 715, Double clicking on the recursion (or recycle) icon in step 620, will select the preceding connecting node in step 625. All other nodes have been expanded automatically, so the tree display continues at data object 710 with data resource 720 "Temporary Target". The rest of the lineage tree 705 has no recursive elements. If there are no duplicate nodes on the lineage data list, system 10 proceeds to step 650, expanding the tree and ends expansion at step 655. All nodes in tree 705 are now displayed in the expanded format as shown by the "−" symbol at the expansion nodes, typified by nodes 215, 710, and 720. To collapse a node, the user may click on the "−" at a node such as node 215. The tree will be truncated at that point and the "−" will be replaced by a "+", indicating that the tree is not fully displayed and can be expanded at that point.

It is to be understood that the specific embodiments of the invention that have been described are merely illustrative of certain application of the principle of the present invention. Numerous modifications may be made to the system and method for displaying a recursive relationship between objects in a tree invention described herein without departing from the spirit and scope of the present invention. Moreover, while the present invention is described for illustration purpose only in relation to the WWW and to search results, it should be clear that the invention is applicable as well to file systems or any other data or data system based on a hierarchical structure.

What is claimed is:

1. A method for displaying objects that are related by a recursive relationship without infinitely repeating the objects, comprising:
    displaying an object having a plurality of expandable nodes that are arranged in a tree hierarchy;
    expanding at least one of the nodes;
    determining if an expanded node is a repeating node by examining the expanded node for the presence of the recursive relationship;
    setting the repeating node as a last node in the tree hierarchy to prevent the tree hierarchy from being infinitely expanded;
    providing a visual clue following the repeating node, to indicate the presence of the repeating node; and
    upon selecting the visual clue, a preceding node is selected in the tree hierarchy that would have followed the repeating node had the repeating node not been set as the last node in the tree hierarchy.

2. The method of claim 1, wherein expanding at least one of the nodes comprises automatically expanding the plurality of expandable nodes.

3. The method of claim 1, wherein expanding at least one of the nodes comprises selectively expanding an individually selected expandable node.

4. The method of claim 1, wherein examining the expanded node for the presence of the recursive relationship comprises comparing at least one child node of the expanded node to a preceding ancestor node in the tree hierarchy.

5. The method of claim 4, wherein comparing at least one child node of the expanded node to a preceding ancestor node in the tree hierarchy comprises comparing a sequence of child nodes of the expanded node to a preceding sequence of ancestor nodes in the tree hierarchy.

6. The method of claim 5, wherein if the sequence of child nodes of the expanded node matches the preceding sequence of ancestor nodes in the tree hierarchy, confirming the expanded node to be a repeating node.

7. The method of claim 1, further comprising generating a search query in Structured Query Language.

8. The method of claim 7, further comprising generating a search result based on the search query.

9. The method of claim 8, wherein displaying the object comprises displaying the search result.

10. The method of claim 1, wherein the visual clue is a recycle icon.

11. A computer program product having instruction codes stored on a computer-readable medium, for displaying objects that are related by a recursive relationship without infinitely repeating the objects, comprising:
    a first set of instruction codes that displays an object having a plurality of expandable nodes that are arranged in a tree hierarchy;
    a second set of instruction codes that expands at least one of the nodes;
    a third set of instruction codes that determines if an expanded node is a repeating node by examining the expanded node for the presence of the recursive relationship;

a fourth set of instruction codes that sets the repeating node as a last node in the tree hierarchy to prevent the tree hierarchy from being infinitely expanded;

a fifth set of instruction codes that provides a visual clue following the repeating node, to indicate the presence of the repeating node; and a sixth set of instruction codes that, upon selecting the visual clue, selects a preceding node in the tree hierarchy that would have followed the repeating node had the repeating node not been set as the last node in the tree hierarchy.

12. The computer program product of claim 11, wherein the second set of instruction codes automatically expands the plurality of expandable nodes.

13. The computer program product of claim 11, wherein the second set of instruction codes selectively expands an individually selected expandable node.

14. The computer program product of claim 11, wherein the second set of instruction codes compares at least one child node of the expanded node to a preceding ancestor node in the tree hierarchy.

15. The computer program product of claim 14, wherein the second set of instruction codes compares a sequence of the child nodes of the expanded node to a preceding sequence of ancestor nodes in the tree hierarchy.

16. The computer program product of claim 15, wherein the second set of instruction codes confirms the expanded node to be a repeating node if the sequence of child nodes of the expanded node matches the preceding sequence of ancestor nodes in the tree hierarchy.

17. The computer program product of claim 11, wherein the object is generated by a search query in Structured Query Language.

18. The computer program product of claim 17, wherein the object comprises a query search result.

19. The computer program product of claim 18, wherein the first set of instruction codes displays the query search result.

20. The computer program product of claim 11, wherein the visual clue is a recycle icon.

21. A system for displaying objects that are related by a recursive relationship without infinitely repeating the objects, comprising:

means for displaying an object having a plurality of expandable nodes that are arranged in a tree hierarchy;

means for expanding at least one of the nodes;

means for determining if an expanded node is a repeating node by examining the expanded node for the presence of the recursive relationship;

means for setting the repeating node as a last node in the tree hierarchy to prevent the tree hierarchy from being infinitely expanded;

means for providing a visual clue following the repeating node, to indicate the presence of the repeating node; and means for, upon selecting the visual clue, selecting a preceding node in the tree hierarchy that would have followed the repeating node had the repeating node not been set as the last node in the tree hierarchy.

22. The system of claim 21, wherein the expanding means automatically expands the plurality of expandable nodes.

23. The system of claim 21, wherein the expanding means selectively expands an individually selected expandable node.

24. The system of claim 21, wherein the expanding means compares at least one child node of the expanded node to the preceding ancestor node in the tree hierarchy.

25. The system of claim 24, wherein the expanding means compares a sequence of child nodes of the expanded node to a preceding sequence of ancestor nodes in the tree hierarchy.

26. The system of claim 25, wherein the expanding means confirms the expanded node to be a repeating node if the sequence of child nodes of the expanded node matches the preceding sequence of ancestor nodes in the tree hierarchy.

27. A computer usable medium having instruction codes for use with a display system for displaying objects that are related by a recursive relationship without infinitely repeating the objects, comprising:

a first set of instruction codes for displaying an object having a plurality of expandable nodes that are arranged in a tree hierarchy;

a second set of instruction codes for expanding at least one of the nodes;

a third set of instruction codes for determining if an expanded node is a repeating node by examining the expanded node for the presence of the recursive relationship;

a fourth set of instruction codes for setting the repeating node as a last node in the tree hierarchy to prevent the tree hierarchy from being infinitely expanded;

a fifth set of instruction codes for providing a visual clue following the repeating node, to indicate the presence of the repeating node; and a sixth set of instruction codes for, upon selecting the visual clue, selecting a preceding node in the tree hierarchy that would have followed the repeating node had the repeating node not been set as the last node in the tree hierarchy.

28. The computer usable medium of claim 27, wherein the second set of instruction codes automatically expands the plurality of expandable nodes.

29. The computer usable medium of claim 27, wherein the second set of instruction codes selectively expands an individually selected expandable node.

30. The computer usable medium of claim 27, wherein the second set of instruction codes compares at least one child node of the expanded node to a preceding ancestor node in the tree hierarchy.

31. The computer usable medium of claim 30, wherein the second set of instruction codes compares a sequence of child nodes of the expanded node to a preceding sequence of ancestor nodes in the tree hierarchy.

32. The computer usable medium of claim 30, wherein the second set of instruction codes confirms the expanded node to be a repeating node if the sequence of child nodes of the expanded node matches the preceding sequence of ancestor nodes in the tree hierarchy.

* * * * *